United States Patent
Daly et al.

(10) Patent No.: US 8,062,804 B2
(45) Date of Patent: Nov. 22, 2011

(54) FLOW CONTROL ASSEMBLY FOR USE WITH FUEL CELL SYSTEMS OPERATING ON FUELS WITH VARYING FUEL COMPOSITION

(75) Inventors: Joseph M. Daly, Bethel, CT (US); Fred C. Jahnke, Rye, NY (US); Steven A. Koehler, Ridgefield, CT (US)

(73) Assignee: FuelCell Energy, Inc., Danbury, CT (US)

( * ) Notice: Subject to any disclaimer, the term of this patent is extended or adjusted under 35 U.S.C. 154(b) by 1028 days.

(21) Appl. No.: 11/931,746

(22) Filed: Oct. 31, 2007

(65) Prior Publication Data

US 2009/0110989 A1    Apr. 30, 2009

(51) Int. Cl.
*H01M 8/04* (2006.01)
(52) U.S. Cl. ........ 429/443; 429/433; 429/436; 429/437; 429/442; 429/448; 429/449
(58) Field of Classification Search .................. 429/443, 429/448, 449, 436, 437, 433, 442
See application file for complete search history.

(56) References Cited

U.S. PATENT DOCUMENTS

| | | | |
|---|---|---|---|
| 6,455,181 B1 * | 9/2002 | Hallum | 429/423 |
| 6,977,121 B2 * | 12/2005 | Balliet et al. | 429/427 |
| 7,537,848 B1 * | 5/2009 | Lienkamp et al. | 429/429 |

\* cited by examiner

*Primary Examiner* — Patrick Ryan
*Assistant Examiner* — Julian Anthony
(74) *Attorney, Agent, or Firm* — Cowan, Liebowitz & Latman, PC (57) ABSTRACT

A flow control assembly for use in a fuel cell system, comprising a sensor for sensing hydrogen concentration in one of anode exhaust leaving an anode side of the fuel cell system and a gas derived from the anode exhaust, and a fuel flow control assembly for controlling the flow of fuel to the anode side of the fuel cell system based on the hydrogen concentration sensed by the sensor.

17 Claims, 3 Drawing Sheets

FLOW CONTROL ASSEMBLY FOR USE WITH FUEL CELL SYSTEMS OPERATING ON FUELS WITH VARYING FUEL COMPOSITION

BACKGROUND OF THE INVENTION

This invention relates to fuel cells and, in particular, to a gas flow control assembly for use in fuel cell systems.

A fuel cell is a device which directly converts chemical energy stored in hydrocarbon fuel into electrical energy by means of an electrochemical reaction. Generally, a fuel cell comprises an anode and a cathode separated by an electrolyte, which serves to conduct electrically charged ions. In order to produce a useful power level, a number of individual fuel cells are stacked in series with an electrically conductive separator plate between each cell.

Fuel cells operate by passing a reactant fuel gas through the anode, while oxidizing gas is passed through the cathode. The electrical output of the fuel cell system depends in part on the rates at which the fuel gas and the oxidizing gas are supplied to, and are carried through, the anode and the cathode, respectively, as well as on the energy content of the fuel. In addition, the efficiency of the fuel cell system depends in part on the fuel utilization, i.e. percentage of fuel utilized by the fuel cell, which is dependent on the fuel's energy content and the fuel flow rate. Conventional fuel cell systems are typically operated at a lower than an optimized fuel utilization, and thus at a lower efficiency, by passing more fuel through the fuel cell than is required for optimized operation in order to avoid starving the fuel cell system of fuel due to variations in the energy content of fuel Therefore, in order to optimize the fuel cell performance and to obtain a desired electrical output and efficiency from the fuel cell system, the energy content of the fuel needs to be monitored and the flow rate at which the fuel is supplied to the cells needs to be precisely controlled.

Conventional fuel cell systems have typically employed mass flow controllers to control the flow rate of the fuel gas to the fuel cell anodes according to the power output of the fuel cell. Conventional systems have also employed an online fuel composition analyzer to determine the composition of the fuel being supplied to the fuel cell system. In particular, mass flow controllers have been used in combination with the online fuel composition analyzer to control the amount of fuel being delivered to the fuel cell based on the fuel composition determination by the composition analyzer and on the power output of the cell.

As can be appreciated, these conventional methods of controlling the flow rate of the fuel to the anodes require the use of complex equipment. In addition, the reliability of the online fuel composition analyzer significantly declines when the fuel being analyzed has a high moisture content and significant variation in composition of the fuel, and also after prolonged operation of the analyzer. Therefore, the analyzer often needs to be re-calibrated to continue to accurately determine the fuel content. Accordingly, a means for controlling the fuel flow to the anode is needed which is accurate and reliable without requiring expensive equipment.

Another assembly and method for controlling the flow rate of fuel to the anode are provided in a commonly-assigned U.S. patent application Ser. No. 11/089,799, which is incorporated herein by reference. The '799 application discloses a control assembly which adjusts the flow of oxidant gas to the cathode based on content variations of anode exhaust gas and controls the flow of fuel to the anode based on the oxidant flow adjustment. Although the assembly disclosed in the '799 application does not require expensive equipment, an improved fuel flow control assembly with faster and more accurate flow adjustment is desired. In addition, means for controlling the fuel flow to the anode that is not affected by ambient temperature is also desired.

It is an object of this invention to provide an improved gas flow control assembly for controlling the flow of fuel to the anode which is reliable, accurate and which provides faster fuel flow adjustment.

It is a further object of the invention to provide an improved gas flow control assembly for controlling the flow of fuel to the anode which is not affected by ambient temperature and which has increased sensitivity to fuel composition variations.

SUMMARY OF THE INVENTION

The above and other objectives are realized in a flow control assembly for use in a fuel cell system comprising a sensor for sensing hydrogen concentration in anode exhaust leaving an anode side of the fuel cell system or a gas derived from the anode exhaust, and a fuel flow control assembly for controlling the flow of fuel to the anode side of the fuel cell system based on the hydrogen concentration sensed by the sensor. The sensor optionally comprises a GE XMTC sensor, a Conspec sensor or a Panterra-TCOND sensor.

The fuel cell system in which the flow control assembly is used includes a cooling assembly adapted to receive a predetermined portion of the anode exhaust from the anode side and to cool the predetermined portion of the anode exhaust, condensing at least a portion of the water in the anode exhaust, so as to output separated water and separated anode exhaust. In such fuel cell systems, the sensor of the flow control assembly senses hydrogen concentration in the gas derived from the anode exhaust, which comprises the separated anode exhaust. In certain embodiments, the cooling assembly comprises a cooling connecting line for passing the predetermined portion, typically a small sample, of the anode exhaust therethrough at a predetermined flow rate to condense the water in the anode exhaust through heat loss to the ambient air and to output the separated anode exhaust and the separated water, a gas loop connecting line for receiving the separated anode exhaust and passing the separated anode exhaust to the sensor and a water loop for receiving separated water from the cooling connecting line. In other illustrative embodiments, the cooling assembly comprises a heat exchanger and a knock out pot, or one or more of a partial-pressure swing water transfer device, an enthalpy wheel humidifier, a cooling radiator, a membrane, a packed column and an absorber/stripper system.

The flow control assembly includes a fuel flow control assembly which determines a fuel flow set point based on a hydrogen ($H_2$) equivalents value of the fuel, which is determined using the hydrogen concentration sensed by the sensor, the current being produced by the fuel cell and the measured flow rate of the fuel through the anode. The fuel flow control assembly controls the flow of fuel to the anode side based on the fuel flow set point so as to maintain fuel utilization in the fuel cell system within a predetermined range. The fuel flow control assembly includes a fuel trim controller which determines the hydrogen ($H_2$) equivalents value of the fuel based on the hydrogen concentration sensed by the sensor and a fuel flow set point based on the hydrogen ($H_2$) equivalents value and the desired fuel utilization. The fuel flow control assembly also includes a fuel flow controller which controls the flow of fuel based on the fuel flow set point determined by the fuel trim controller.

In certain embodiments, the fuel cell system is also adapted to receive water from a water supply for humidifying the fuel before providing the fuel to the anode side and the flow control system includes a water flow control assembly which controls the flow of the water to the fuel cell system based on controlling of the fuel flow to the anode side by the fuel flow control assembly. In particular, the water flow control assembly controls the flow of water to the system based on the fuel flow set point determined by the fuel trim controller so as to maintain a predetermined carbon to steam ratio in the humidified fuel.

A flow control method and a fuel cell system including a flow control assembly are also described.

BRIEF DESCRIPTION OF THE DRAWINGS

The above and other features and aspects of the present invention will become more apparent upon reading the following detailed description in conjunction with the accompanying drawings in which.

DETAILED DESCRIPTION

Figure 1:
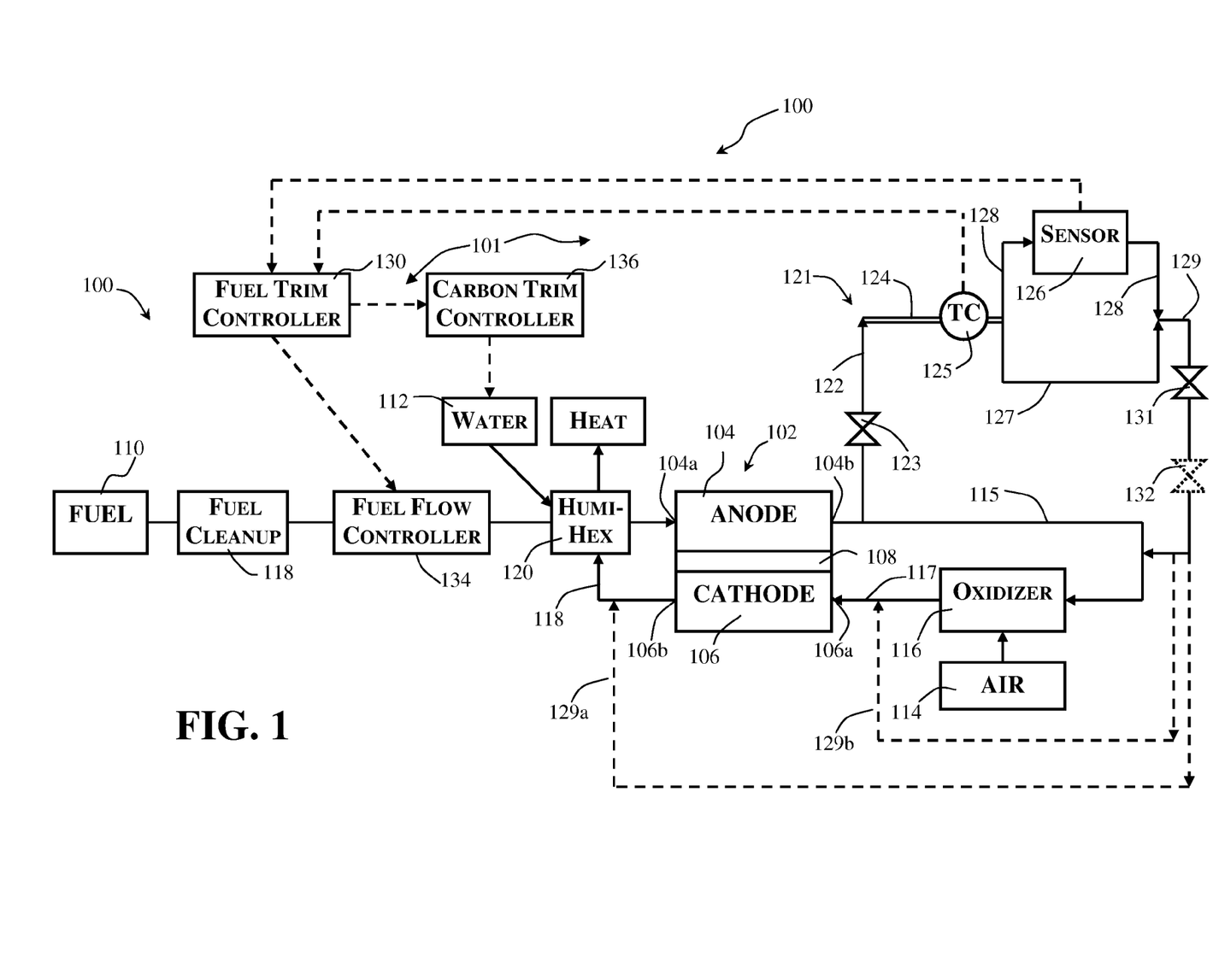
FIG. 1 shows a fuel cell system employing a first embodiment of a flow control assembly.

FIG. 1 shows a fuel cell system 100 employing a flow control assembly 101 which includes a fuel flow controller 134, a fuel trim controller 130, and a sensor 126, all of which are used to control the flow of fuel to a fuel cell stack 102 of the system. In certain embodiments, the flow control assembly 101 also includes a carbon trim controller 136 for controlling the amount of water used to humidify the fuel supplied to the fuel cell stack 102 and a thermocouple 125, or any other suitable temperature measuring device, for compensation due to humidity in the anode exhaust gas.

The fuel cell system 100 includes the fuel cell stack 102 comprising at least one fuel cell. In FIG. 1, the fuel cell stack 102 is schematically shown to include an anode 104, adapted to receive fuel and a cathode 106, adapted to receive cathode oxidant gas, separated by an electrolyte 108. It is understood that the stack 102 may include a plurality of fuel cells, each of which includes an anode and a cathode separated by an electrolyte. The system 100 is supplied with fuel from a fuel supply 110, which provides fuel to the anode 104, and with water from a water supply 112, which supplies water for humidifying the fuel before passing fuel to the anode 104. As shown, the system is also supplied with oxidant gas in the form of air from an air supply 114, which supplies air to an anode exhaust oxidizer 116. As discussed herein below, the oxidizer outputs the cathode oxidant gas to the cathode.

The system 100 of FIG. 1 further includes a fuel clean-up assembly 118, which processes the fuel to provide clean fuel and a heat exchanger 120 adapted to mix clean fuel from the fuel clean-up assembly 118 and water from the water supply 112 to humidify the fuel and to pre-heat the humidified fuel before passing the fuel to the anode 104 of the fuel cell 102.

In the system of FIG. 1, fuel from the fuel supply 110 is supplied to the fuel clean-up assembly 118 which processes the fuel so as to remove contaminants, such as sulfur, from the fuel so that it is suitable for use in the fuel cell anode 104. The fuel clean-up assembly 118 may include a desulfurizer unit for removing sulfur-containing compounds from the fuel. Clean fuel from the fuel clean-up assembly is then supplied to the heat exchanger 120 at a flow rate determined by the fuel trim controller 130 and controlled by the fuel flow controller 134 of the flow control assembly 101. In the heat exchanger 120, clean fuel is mixed with water from the water supply 114 and pre-heated to a predetermined temperature. Although not shown in FIG. 1, the system may also include a deoxidizer/pre-reformer for removing trace oxidant contaminants from the pre-heated humidified fuel and pre-reforming at least a portion of the fuel to hydrogen fuel. The humidified and pre-heated fuel is then conveyed to the fuel cell anode 104 where it undergoes an electrochemical reaction producing an electrical output.

Anode exhaust gas comprising unspent fuel in the form of hydrogen, carbon monoxide, methane, water and carbon dioxide is conveyed from the anode 104 through a first connecting line 115 to the anode exhaust oxidizer 116, which also receives oxidant gas in the form of air from the air supply 114. In the anode exhaust oxidizer 116, oxidant gas in the form of air is mixed with the anode exhaust and combusted to produce heated cathode oxidant gas at a desired temperature. The heated cathode oxidant gas leaving the oxidizer 116 is thereafter conveyed to the cathode side inlet 106a of the fuel cell 102. Depleted cathode oxidant gas exits the cathode 106 through a cathode outlet 106b and flows through the heat exchanger 120 where heat from the exhausted cathode oxidant gas is transferred to pre-heat the fuel and water mixture. Heat remaining in the exhausted cathode oxidant gas after it leaves the heat exchanger 122 may be used in a variety of applications, including space heating and steam formation.

As shown in FIG. 1, a portion of anode exhaust gas leaving the anode 104 is conveyed to the sensor 126 of the flow control system 101 for determining hydrogen concentration in the anode exhaust, which is related to the fuel utilization in the fuel cell 102. As can be appreciated, fuel utilization in the fuel cell is directly related to the amount of unreacted fuel in the anode exhaust, in the form of hydrogen and carbon monoxide, which is dependent on the fuel flow rate through the fuel cell, the current or amperes generated by the fuel cell and the fuel's hydrogen ($H_2$) equivalents value, or the amount of hydrogen produced by reforming the fuel with water, i.e. humidified fuel, which itself is dependent on the fuel composition.

As can also be appreciated, in the anode exhaust gas, all of the fuel, or substantially all of the fuel, has been converted to hydrogen and carbon monoxide. As a result, a complex sensor for measuring and analyzing a large number of gas components for assessing the fuel energy is not required when this assessment is made through the anode exhaust gas. Moreover, while it is possible to measure the amounts of hydrogen and carbon monoxide in the anode exhaust gas, it has been found and tests have shown that the ratio of the hydrogen to carbon monoxide in the anode exhaust is sufficiently stable so that accurate measurement and control can be obtained by measuring only the amount of hydrogen in the anode exhaust gas. Accordingly, measurement of only the amount of hydrogen in the anode exhaust via the sensor 126 greatly simplifies the equipment required since the properties of hydrogen are very different from other possible components of the anode exhaust gas.

Additionally, in order to accurately measure the hydrogen in the anode exhaust via the sensor 126, the anode exhaust gas first needs to be cooled to below the maximum operational temperature of the sensor 126. Due to the high water content in the anode exhaust gas, the cooling of the anode exhaust will typically condense at least a portion of water present in the anode exhaust. This water then needs to be separated from the other components of the anode exhaust gas before being passed through the sensor 126 to avoid interference of liquid water with the sensor's operation.

Accordingly, as shown in FIG. 1, the portion of the anode exhaust is first passed via a second connecting line 122, to a cooling assembly 121 before being passed to the sensor 126. In certain illustrative embodiments, the second connecting line 122 comprises stainless steel heat traced tubing having an outside diameter of about ¼ inches. The amount of anode exhaust passed through the second connecting line 122 is controlled by a first flow control member 123, such as an isolation valve or a fixed orifice. In certain embodiments, the flow of the anode exhaust may be controlled by the diameter and length of the second connecting line 122.

In the cooling assembly 121, condensed water is separated from the anode exhaust and separated water and separated anode exhaust are outputted, the latter separated anode exhaust then being able to be analyzed in the sensor 126 without interference by water. In the illustrative embodiment shown in FIG. 1, the cooling assembly comprises a cooling connecting line 124, a water loop connecting line 127 for bypassing separated water and a gas loop connecting line 128. In particular, the anode exhaust is passed through the cooling connecting line 124 at a low flow rate so as to sufficiently cool the exhaust to condense out and separate water in the exhaust. In this illustrative embodiment, the cooling connecting line 124 comprises stainless steel tubing having an outside diameter of about ¼ to ½ inches and a length of at least 3 inches. The tubing used to form the cooling connecting line 124 may also include heat trace covering to prevent water freezing in cold weather. However, in certain embodiments, it is desired that the heat trace covering comprise no more than 50% of the tubing surface area so as to avoid blockage due to freezing of the separated water when the ambient temperature is low, and to allow sufficient anode exhaust cooling when the ambient temperature is higher. Use of the cooling connecting line 124 to cool the anode exhaust gas and to separate water in the anode exhaust by condensation eliminates the need for a heat exchanger and reduces the cost and complexity of the assembly 101.

In the illustrative embodiment shown in FIG. 1, a temperature sensor 125, such as a thermocouple, is provided in the cooling assembly 121, and in particular, in the cooling connecting line 124, to measure the temperature of the anode exhaust gas. The temperature sensor is positioned in the cooling connecting line 124 so as to measure the lowest temperature to which the anode exhaust is cooled. As discussed in more detail herein below, the temperature measurement by the thermocouple 125 is used to compensate for humidity remaining in the anode exhaust due to variations in the temperature achieved upon cooling to ensure that the measurement by the sensor 126 is properly adjusted or compensated for the humidity or water portion present in the cooled anode exhaust.

After being passed through the cooling connecting line 124, the separated water condensed from the anode exhaust in the cooling connecting line 124 is outputted to the water loop connecting line 127 of the cooling assembly 121, while the separated anode exhaust gas, comprising unreacted fuel, carbon dioxide and water not condensed in the cooling line 124, is outputted to the sensor 126 through the gas loop connecting line 128 of the cooling assembly 121. In the present illustrative embodiment, the cooling connecting line 124, the water loop connecting line 127 and the gas loop connecting line 128 are provided such that the separated water is conveyed to the water loop connecting line 127 by gravitational force. In particular, the cooling connecting line 124 and the gas loop connecting line 128 are provided at a higher level or elevation relative to the water loop connecting line 127, such that the gravitational force draws the separated water from the cooling connecting line 124 in a downward direction into the water loop connecting line 127, while the separated anode exhaust is passed to the gas loop connecting line 128 and is thereafter conveyed to the sensor 126.

The sensor 126 senses and determines the concentration of hydrogen ($H_2$) present in the separated anode exhaust, which is then used by the fuel trim controller 130 to determine fuel utilization (Uf) and fuel flow adjustment needed to achieve the desired Uf. In the present illustrative embodiment, the sensor 126 is a thermal measuring unit such as a thermal conductivity analyzer. Suitable sensors for use as the sensor 126 include GE XMTC sensor manufactured by General Electrics, Conspec CN06 sensor manufactured by Conspec Controls and Panterra-TCOND sensor manufactured by Neodym Technologies.

Separated anode exhaust leaving the sensor 126 is conveyed by the gas loop connecting line 128 and is thereafter combined with the separated water from the water loop connecting line 127. The combined separated anode exhaust and separated water are thereafter conveyed through a third connecting line 129 which is coupled with the first connecting line 115. Alternatively, the combined separated anode exhaust and separated water, or a portion thereof, is conveyed to a connecting line 117 or 118 via a connecting line 129a or 129b, respectively, in order to increase the pressure drop through the cooling assembly 121. As shown in FIG. 1, the third connecting line 129 optionally includes a second flow control member 131, such as an isolation and/or a metering valve, for controlling the flow of the combined gas being passed through the connecting line 129 and for preventing anode exhaust in the connecting line 115 from flowing to the sensor 126 through the connecting line 129. Although the second flow control member 131 typically is not required, it is included to allow isolation and maintenance of the sensor 126 when needed. In certain embodiments, the third connecting line 129 also includes a shut-off control member 132, such as a solenoid shut-off valve. As shown, the combined separated anode exhaust and separated water in the third connecting line 129 are conveyed to the connecting line 115 and mixed with the anode exhaust in the connecting line 115, and thereafter passed to the oxidizer 116. In other embodiments the combined separated anode exhaust and separated water in the third connecting line 129 are conveyed to the connecting line 117 and mixed with cathode inlet oxidant gas or conveyed to the connecting line 118 and mixed with cathode exhaust gas and thereafter vented with the cathode exhaust. Because the flow through the connecting line 129 is small, the point at which the combined separated anode exhaust and separated water are returned to the system has minimal impact on the process.

As mentioned above and shown in FIG. 1, the fuel flow rate from the supply 110 is controlled by the fuel flow controller 134, which may comprise a thermal mass fuel flow meter capable of measuring the fuel flow rate from the supply and adjusting the fuel flow rate from the supply 110 based on a fuel flow set point determined by the fuel trim controller 130. In particular, the fuel from the fuel supply 110 is supplied to the system 100 at a predetermined flow rate, which is the flow rate required for optimum operation and electrical output of the fuel cell 102. The predetermined fuel flow rate is determined based on a desired electrical output of the system 100 and the desired fuel utilization, i.e., percentage of inputted fuel ($H_2$) utilized by the fuel cell. Fuel utilization by the fuel cell is directly related to the fuel's hydrogen ($H_2$) equivalents value, or hydrogen content after reforming, and thus, variations in the hydrogen ($H_2$) equivalents value of the fuel supplied to the fuel cell from the fuel supply 110 result in deviations from the desired fuel utilization unless the fuel flow is corrected. Because the sensor 126 measures the hydrogen content of the fuel directly from the fuel cell, the adjustment to the fuel flow based on the sensor's measurement will also compensate for drifting of a measured fuel flow rate by the flow meter of the fuel flow controller 134 and for possible leaks of fuel between the fuel flow controller 134 and the fuel cell 102.

To maintain the fuel utilization at, or close to (within ±1%), the desired fuel utilization level, the fuel flow controller 134 adjusts the flow rate of fuel to the fuel cell 102 so as to compensate for the variation in the fuel's hydrogen ($H_2$) equivalents value and any drift in the fuel flow controller. More particularly, the fuel trim controller 130 is provided with the sensed $H_2$ concentration from the sensor 126, and determines the fuel utilization in the fuel cell based on the sensed $H_2$ concentration. The fuel trim controller 130 then determines based the determined fuel utilization, a fuel flow set point, which corresponds to an amount of adjustment to fuel flow rate to the fuel cell 102 or to an adjusted fuel flow rate required to maintain the desired fuel utilization value. The fuel flow controller 134 receives the fuel flow set point determined by the fuel trim controller 130, and based on the fuel flow set point controls the fuel flow rate from the fuel supply 110 to the fuel cell 102.

For example, if the sensed $H_2$ concentration in the anode exhaust increases, the fuel trim controller determines that fuel utilization in the fuel cell has decreased due to a higher hydrogen ($H_2$) equivalents value of the fuel. In such case, the fuel trim controller determines and sets the fuel flow set point so that the fuel flow controller controls the fuel flow rate to decrease based on the fuel flow set point. The decreased flow rate would supply less hydrogen in the fuel to be reacted and utilized in the fuel cell, thus increasing the fuel utilization. Likewise, when the sensed $H_2$ concentration in the anode decreases, the fuel utilization increases and the fuel trim controller determines and sets the fuel flow set point so that the fuel flow controller controls the fuel flow rate to increase causing a smaller fraction of the supplied hydrogen to react in the fuel cell.

Thus, when the heating value of the fuel changes due to variations in fuel composition, the fuel trim controller 130 determines the fuel flow set point based on the variations in the fuel composition and the fuel flow controller 134 adjusts the flow rate of the fuel, by reducing or increasing the fuel flow rate, so that the fuel utilization is maintained at the desired value.

In certain illustrative embodiments which use the temperature sensing unit 125 in the cooling line 124, the fuel trim controller 130 also uses the anode exhaust temperature sensed by the temperature sensing unit 125 to compensate for humidity in the separated anode exhaust in determining the fuel flow set point. In this way, if the ambient air temperature is high and the cooled separated anode exhaust gas includes a high amount of humidity due to its higher temperature, the fuel flow set point determination would not be distorted by the additional humidity present in the cooled separated anode exhaust gas.

In the illustrative embodiment shown in FIG. 1, the flow control system also includes a water flow control assembly comprising a carbon trim controller 136 for controlling the amount of water supplied to the heat exchanger 120 from the water supply 112. In particular, the performance of the fuel cell and the fuel utilization can be influenced by variations in carbon to steam ratio of the fuel supplied to the fuel cell anode 104. The carbon trim controller 136 controls the amount of water supplied to the heat exchanger 120 so that the steam to carbon ratio of the pre-heated humidified fuel supplied from the heat exchanger 120 to the anode 104 is maintained at a predetermined ratio corresponding to optimal fuel cell performance. Since the steam to carbon ratio of the fuel depends on the composition of the fuel and the amount of fuel supplied to the system 100, the carbon trim controller 136 controls the water flow rate based on the determinations of the fuel trim controller 130. Particularly, the carbon trim controller 136 is provided with the fuel flow set point determined by the fuel trim controller 130, and determines the amount of adjustment to the water flow rate based on the fuel flow set point so as to maintain the predetermined steam to carbon ratio substantially constant despite a varying fuel composition. Although not shown in FIG. 1, in some embodiments, the carbon trim controller 136 may adjust the water flow rate based on fuel flow rate adjustments performed by the fuel flow controller 134.

It is understood that the construction and components of the flow control assembly 101 shown in FIG. 1 may vary depending on the configuration of the sensor 126 used in the assembly 101 and the requirements of the fuel cell system 100. For example, the configuration of the cooling assembly 121 of FIG. 1 may be modified to include a water transfer device, such as a knock out pot, to ensure removal of condensed water from the anode exhaust. The system 200 having such a configuration of the cooling assembly is shown in FIG. 2.

Figure 2:
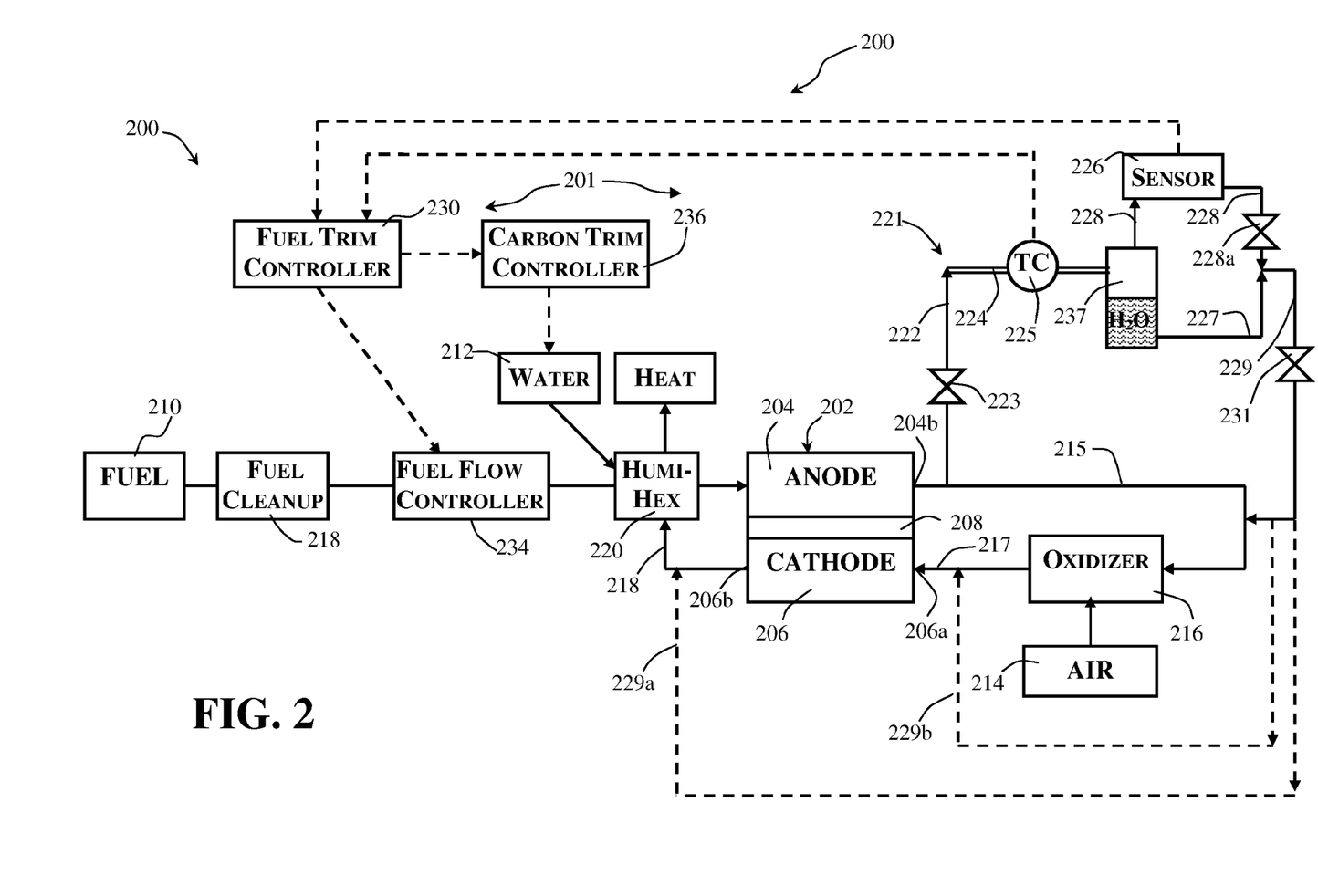
FIG. 2 shows a fuel cell system of FIG. 1 employing another embodiment of the flow control assembly.

As can be seen in FIG. 2, the configuration of the system 200 is substantially the same as the fuel cell system 100 of FIG. 1. In FIG. 2, the components of the system 200 that are similar to those of FIG. 1 have been numbered using similar reference numbers, and a full description of the system 200 has been omitted. The configurations of the cooling assembly 221 and of the flow control assembly 201 will be described in detail herein below.

As shown, the flow control assembly 201 comprises a fuel flow controller 234, a fuel trim controller 230, and a sensor 226. In certain illustrative embodiments, the flow control assembly 201 also includes a temperature sensor 225, such as a thermocouple, upstream of the sensor 226 and a carbon trim controller 236 for controlling water flow rate to the system 200. The cooling assembly 221 includes a cooling connecting line 224 coupled with a second connecting line 222 for receiving anode exhaust from the second connecting line 222 and coupled with a water transfer device 237, a water loop connecting line 227 for conveying water separated from the anode exhaust in the water transfer device 237, a gas loop connecting line 228 for passing separated anode exhaust from the water transfer device 237 to the sensor 226.

As shown in FIG. 2, anode exhaust gas comprising unspent fuel in the form of hydrogen and carbon monoxide mixed with water and $CO_2$ is conveyed from a fuel cell anode 204 through a first connecting line 215 to the anode exhaust oxidizer 216. The oxidizer 216 also receives oxidant gas in the form of air from an air supply 214, which is mixed with the anode exhaust and combusted to produce heated cathode oxidant gas. As also shown, a portion or a sample of the anode exhaust leaving the anode 204 in the first connecting line 215 is passed to the sensor 226 for determining hydrogen concentration in the anode exhaust which is thereafter used for determining fuel utilization in the fuel cell 202 and fuel flow adjustment. In particular, this portion of the anode exhaust is first conveyed via the second connecting line 222 to the cooling assembly 221 in which the anode exhaust is cooled to allow proper operation of the sensor. The cooling assembly 221 also separates the water, condensed from the anode exhaust as a result of the cooling, and outputs separated water and separated anode exhaust. In certain illustrative embodiments, the second connecting line 222 comprises stainless steel heat traced tubing, in which heat tracing is used only to prevent freezing during cold weather conditions.

As shown, anode exhaust is passed from the second connecting line 222 to the cooling connecting line 224, which comprises stainless steel tubing, which may have a larger outside diameter than the second connecting line 222. The anode exhaust is passed through the cooling connecting line 224 at a low flow rate to sufficiently cool the anode exhaust to below the maximum allowable sensor operating temperature and to condense water in the exhaust. After passing through the cooling connecting line 224, anode exhaust is conveyed to the water transfer device 237 in which anode exhaust is further cooled and water is separated from the other components of the anode exhaust to produce separated water and separated anode exhaust. In certain illustrative embodiments, the water transfer device 237 comprises a knock out pot. In other illustrative embodiments, the water transfer device 237 comprises one of a heat exchanger, a packed column, a partial-pressure swing water transfer device, a conventional enthalpy wheel humidifier, a cooling radiator, a membrane, a packed column or an absorber/stripper type system or any other assembly suitable for separating water from the anode exhaust gas. Separated water is passed from the water transfer device 237 to the water loop connecting line 227, while separated anode exhaust comprising the other anode exhaust components, i.e., unreacted fuel, carbon dioxide and traces of water not separated in the water transfer device 237, is conveyed to the sensor 226 through the gas loop connecting line 228.

As in FIG. 1, a temperature sensor 225 may be provided to measure the temperature of the anode exhaust gas and to determine the lowest temperature to which the anode exhaust is cooled. The temperature sensor 225 may comprise a thermocouple or any other suitable temperature sensing device. In the embodiment shown in FIG. 2, the temperature sensor 225 is provided in the cooling connecting line 224 of the cooling assembly 221. However, in other illustrative embodiments, the temperature sensor 225 may be provided in the gas loop connecting line 228 for measuring the temperature of the separated anode exhaust gas after being further cooled in the water transfer device 237. As in FIG. 1, the temperature measurement by the temperature sensor 225 is used to compensate for humidity in the cooled separated anode exhaust and to ensure that the measurement by the sensor 226 is properly corrected for any residual humidity in the separated anode exhaust.

The sensor 226 receives the separated anode exhaust and senses the concentration of $H_2$ present in the separated anode exhaust, which is then used to determine fuel utilization (Uf) and fuel flow adjustment in the fuel trim controller 230. As in FIG. 1, the sensor 226 is a thermal conductivity analyzer, such as Conspec CN06 sensor manufactured by Conspec Controls. Other sensors, such as GE XMTC manufactured by General Electrics or Panterra-TCOND manufactured by Neodym Technologies are suitable for use as the sensor 226.

After passing through the sensor 226, the separated anode exhaust is conveyed through the gas loop connecting line 228 and is then combined with the separated water from the water loop connecting line 227. In certain embodiments, a flow control member 228a is provided in the gas loop connecting line 228 downstream from the sensor 226 for controlling the flow of separated anode exhaust gas to be combined with the separated water and to prevent separated water from entering the sensor 226 through the gas loop connecting line 228. As discussed herein above with respect to FIG. 1, the combined separated anode exhaust gas and separated water are then vented or conveyed to a return point downstream in the process, so as to be combined with the anode exhaust, the cathode inlet oxidant gas or the cathode exhaust gas.

As shown, the combined mixture of the separated water and separated anode exhaust is thereafter conveyed through the third connecting line 229 to the first connecting line 215. The third connecting line 229 includes a flow control member 231, such as an isolation and/or a metering valve, for controlling the flow of the combined mixture being passed through the connecting line 229. The flow control member 231 also allows the sensor 226 to be isolated for maintenance. The combined mixture of the separated anode exhaust and the separated water in the connecting line 229 is conveyed to the connecting line 215, in which it is mixed with the anode exhaust and passed to the oxidizer 216.

As in FIG. 1, the fuel flow rate of the fuel in this embodiment from the fuel supply 210 to the fuel cell system 200 is controlled by the fuel flow controller 234. In certain embodiments, the fuel flow controller 234 is a thermal mass fuel flow meter adapted to measure the fuel flow rate and to correct the fuel flow rate based on a fuel flow set point provided by the fuel trim controller 230. As discussed herein above, the fuel flow rate is controlled by the fuel flow controller 234 so that the fuel cell system 200 generates a desired electrical output and so that fuel utilization in the fuel cell 202 is maintained at or close to the desired fuel utilization. Adjustments to the flow rate of fuel are performed by the fuel flow controller 234 based on the fuel flow set point determined by the fuel trim controller 230 to compensate for variations in the heating value of the fuel being supplied to the fuel cell.

In particular, the sensed $H_2$ concentration is provided by the sensor 226 to the fuel trim controller 230, which determines fuel utilization in the fuel cell based on the sensed $H_2$ concentration. Based on the determined fuel utilization value, and other factors, such as measured fuel flow rate, Amps produced by the fuel cell stack 202 and number of cells in the fuel cell stack 202, the fuel trim controller 230 determines the fuel flow set point which corresponds to the amount of adjustment to the fuel flow rate from the fuel supply 210 to the system 200.

As shown, the flow control system 201 of FIG. 2 also includes a carbon trim controller 236 which controls the amount of water supplied to the system, and in particular, to the heat exchanger 220 for humidifying the fuel. As in the system of FIG. 1, the carbon trim controller 236 controls the water flow rate based on the determinations of the fuel trim controller 230 so as to maintain a predetermined carbon to steam ratio of the fuel provided to the fuel cell stack 202.

It is understood that the configuration of the fuel cell system and the particular components used in the system and in the flow control system may vary depending on the type of sensor and the cooling requirements for the anode exhaust. For example, in certain illustrative embodiments, the water loop connecting line may pass through a housing of the sensor. However, it is understood that the operations performed by the fuel trim controller are substantially the same or similar in such varied system configurations. The operation of the flow control system 101, 201 of FIGS. 1 and 2, and in particular, the operation of the fuel trim controller 130, 230 and the carbon trim controller 136, 236, is illustrated in more detail in the flow chart shown in FIG. 3.

Figure 3:
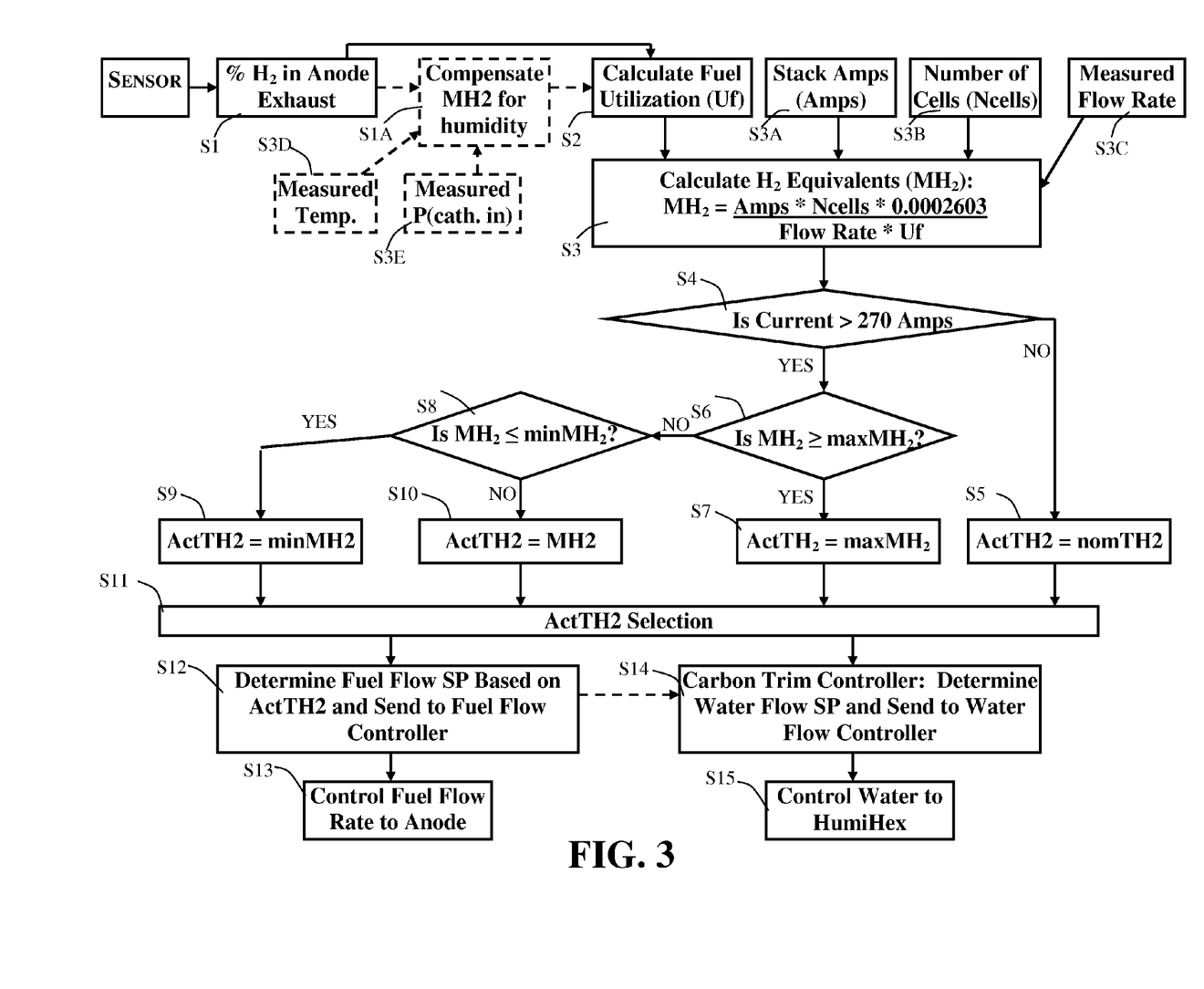
FIG. 3 shows a flow chart of operations of a fuel trim controller of the flow control assembly of FIGS. 1 and 2.

As discussed herein above and as shown in FIG. 3, the sensor senses the hydrogen concentration in anode exhaust passing through the sensor, and the sensed hydrogen concentration, in % H₂ present in the anode exhaust, is received by the fuel trim controller 130 in a first step S1.

As also discussed above, in certain embodiments the fuel cell system also includes a temperature sensor (125, 225 in FIGS. 1 and 2) for sensing the lowest temperature to which the anode exhaust is cooled, and the temperature sensed (S3D) by the temperature sensor is provided to the fuel trim controller. In addition, pressure at the cathode inlet (S3E) is measured and also provided to the fuel trim controller.

In such embodiments, the fuel trim controller's operation after receiving the sensed % H₂ present in the anode exhaust in the first step S1 proceeds to step S1A, in which the fuel trim controller uses the temperature sensed by the temperature sensor and the cathode inlet pressure to compensate for humidity the measured % H₂ in the separated anode exhaust. In particular, in this case, the fuel trim controller determines a compensated % H₂ value which is compensated for any humidity in the separated anode exhaust using the following equation:

$$\text{Compensated \% H}_2 = \frac{\text{Measured \% H}_2}{(1 - \% \text{ H}_2\text{O})} \quad (1)$$

in which the compensated % H₂ is the hydrogen concentration compensated for humidity in the separated anode exhaust and the measured % H₂ is the hydrogen concentration sensed by the sensor and received by the fuel trim controller in the first step S1. The % H₂O value used in equation (1) for calculating the compensated % H₂ is the concentration of water in the separated anode exhaust which is determined using the following equation:

$$\% \text{ H}_2\text{O} = \frac{(4.030179E\text{-}2 * \exp(3.066433E\text{-}2 * T))}{P(\text{cathode in})} \quad (2)$$

in which T is the measured temperature (S3D) received by the fuel trim controller in degrees F. and P(cathode in) is a measured cathode inlet pressure (S3E) in psia units. Alternatively, the effect of humidity on the measured hydrogen concentration may be empirically derived by collection of calibration data to allow for accurate compensation for humidity. After the sensed hydrogen concentration in the separated anode exhaust is compensated for humidity, the operation of the fuel trim controller proceeds to step S2.

In a second step S2, the fuel trim controller calculates fuel utilization (Uf) in the fuel cell based on the sensed hydrogen concentration received in step S1 or based on the compensated hydrogen concentration in step S1A. In particular, fuel utilization and the sensed or compensated hydrogen concentration have an established linear relationship with one another, which depends on the type of fuel used in the system and the size and type of fuel cell stack. For example, fuel utilization in a 300 kW fuel cell stack using natural gas as fuel is calculated using the following equation:

$$Uf = -1.402*(\% \text{ H}_2/100) + 0.9299 \quad (3)$$

The fuel utilization (Uf) value calculated in the second step S2 is then used by the fuel trim controller in the next step S3 to calculate a measured hydrogen equivalents value, or MH₂, of the fuel. In calculating the MH2 value, the fuel trim controller also uses the amount of current produced by the fuel cell stack in Amperes (Amps) S3A, the number of fuel cells (Ncells) in the fuel cell stack S3B and the measured fuel flow rate S3C. The MH2 equivalents value is calculated by the fuel trim controller using the following equation:

$$MH_2 = \frac{Amps * Ncells * 0.0002603}{\text{Flow Rate} * Uf} \quad (4)$$

where Amps is the amount of current (Amperes) produced in the fuel cell stack, Ncells corresponds to the number of fuel cells in the stack and the Flow Rate is the measured fuel flow rate scfm.

After calculating the MH2 equivalents value in step S3, the operation of the fuel trim controller proceeds to step S4 in which the fuel trim controller determines whether the amount of current (Amps) produced by the fuel cell stack is greater than a predetermined amount. In the illustrative embodiment in FIG. 3, the predetermined amount of current is greater than approximately 25% of the load, or 270 Amps for a 300 KW Direct FuelCell® (DFC) fuel cell system, and in step S4, the fuel trim controller determines whether the current produced by the fuel cell stack is greater than 270 Amps. It is understood, however, that the predetermined amount of current may vary depending on the size of the fuel cell stack and the maximum current produced by the stack.

If in step S4, the fuel trim controller determines that the current produced by the fuel cell stack is less than the predetermined amount, then the operation of the fuel trim controller proceeds to step S5, in which the fuel trim controller sets an active hydrogen equivalents value, or ActTH2 value, to be equal to a predetermined nominal value nomTH2. The predetermined nominal value nomTH2 corresponds to a zero fuel flow rate adjustment.

If in step S4, the fuel trim controller determines that the current produced by the fuel cell stack is greater than the predetermined amount, then the operation of the fuel trim controller proceeds to step S6, in which the fuel trim controller determines whether the calculated MH2 equivalents value is greater than, or equal to, a predetermined maximum MH2 equivalents value (maxMH₂) corresponding to a maximum negative flow adjustment. If the fuel trim controller determines in step S6 that the calculated MH2 equivalents value is greater than, or equal to, the maximum equivalents value, then the fuel trim controller sets the active hydrogen equivalents value ActTH2 to be equal to the maximum equivalents value maxMH2 in step S7. Although not shown in FIG. 3, the fuel trim controller also activates an alarm when the fuel trim controller determines in step S6 that the calculated equivalents value is greater than, or equal to, the maximum equivalents value, to alert the system's operator. The operation of the fuel trim controller then proceeds to step S11.

If in step S6, the fuel trim controller determines that the calculated MH2 equivalents value is smaller than the maximum equivalents value maxMH2, the operation of the fuel trim controller proceeds to step S8, in which the fuel trim controller determines whether the calculated MH2 equivalents value is smaller than, or equal to, a predetermined minimum equivalents value minMH₂. The minimum equivalents value corresponds to a predetermined maximum positive fuel flow adjustment. The use of minimum and maximum equivalents values (minMH2 and max MH2) allows the system to limit the fuel flow adjustment, either positively or negatively, to a predetermined range.

If the fuel trim controller determines in step S8 that the calculated MH2 equivalents value is greater than the predetermined minimum equivalents value minMH2, then the active hydrogen equivalents value ActTH2 is set to be equal to the calculated equivalents value MH2 in step S10. If in step S8, the fuel trim controller determines that the calculated MH2 equivalents value is smaller than, or equal to, the predetermined minimum equivalents value minMH2, then the fuel trim controller sets the active hydrogen equivalents value ActTH2 to be equal to the minimum equivalents value minMH2 in step S9. Also, although not shown in FIG. 3, the fuel trim controller activates an alarm to alert the system's operator that the calculated equivalents value is smaller than, or equal to, the minimum equivalents value. The operation of the fuel trim controller thereafter proceeds to step S11.

In step S11, the fuel trim controller selects the active hydrogen equivalents value ActTH2 based on the ActTH2 value determined in steps S5, S7, S9 or S10, for implementation by the fuel trim controller in steps S12 and S13 and by the carbon trim controller in steps S14 and S15. In step S12, the fuel trim controller uses the ActTH2 value selected in step S11 to determine a fuel flow set point. The fuel flow set point determined in step S12 is then sent to fuel flow controller which implements the fuel flow set point in step S13 by controlling the fuel flow rate to the fuel cell stack anode side based on the fuel flow set point. The fuel flow rate is controlled by the fuel flow controller by means of a fuel flow control valve or another flow control device of the fuel flow controller.

The ActTH2 value selected in step S11 is also used by the carbon trim controller in step S14 to determine water flow set point. The water flow set point determined in step S14 is then implemented in step S15 by means of a water flow control valve, or another flow control device, to control the flow rate of water to the heat exchanger 120 for mixing with the fuel, and thereafter to the fuel cell stack anode side as part of the humidified fuel. As mentioned herein above, the carbon trim controller controls the water flow rate from the water supply so as to maintain the carbon to steam ratio at a predetermined value.

In certain alternative embodiments, the carbon trim controller controls the water flow rate to the heat exchanger based on the fuel flow rate, or the adjustment to the fuel flow rate. In such embodiments, the carbon trim controller is provided with the fuel flow rate, or the adjustment to the fuel flow rate, e.g. fuel flow set point, from the fuel flow controller in step S14. The carbon trim controller then controls the flow rate of water to the heat exchanger in step S15 based on the flow rate, or the adjustment to the fuel flow rate, from the fuel flow controller.

It should be noted that the fuel trim controllers 130 and 230 and the carbon trim controllers 136 and 236 can be provided by proper programming of programmable logic control (PLC) systems or distributed control systems (DSC) or other control systems. Likewise the fuel flow controllers 134 and 234 can be provided by modulating control valves.

The flow control assembly 101, 201 of FIGS. 1 and 2 is fast acting and provides precise results. In particular, the sensor senses the hydrogen concentration in the anode exhaust at predetermined intervals, such as intervals of about 30 seconds, and the fuel trim calculation based on the sensed hydrogen concentration is provided within about 45 seconds. In this way, the flow control assembly is able to respond quickly, i.e. within 30 to 45 seconds, to any variations in fuel utilization due to changes in fuel composition and fuel heating value, the presence of diluents in the fuel, flow transmitter errors and fuel leaks, and to accurately adjust the fuel flow rate to maintain fuel utilization within 1% of the desired fuel utilization level. As mentioned herein above, conventional fuel cell systems typically operate at lower than optimal fuel utilization, and thus at a lower than optimal efficiency, in order to avoid starving the fuel cell of fuel when fuel composition becomes lean and to thereby avoid damage to the fuel cell. In contrast, the quick and precise adjustment of the fuel flow rate based on the sensed fuel composition in the anode exhaust by the flow control assembly of FIGS. 1 and 2, allows the fuel cell system to operate at an optimal fuel utilization and optimal efficiency. Moreover, the flow control assembly of FIGS. 1 and 2 also reduces the risk of the system operating at a greater than optimal fuel utilization, which may also result in damage to the fuel cell system and its components.

In all cases it is understood that the above-described arrangements are merely illustrative of the many possible specific embodiments which represent applications of the present invention. Numerous and varied other arrangements can be readily devised in accordance with the principles of the present invention without departing from the spirit and the scope of the invention.

We claim:

1. A fuel cell system for use with a fuel supply, said fuel cell system comprising:
a fuel cell comprising at least one fuel cell and including an anode side and a cathode side;
a fuel inlet for receiving fuel from a fuel supply to supply said fuel to said anode side;
a flow control assembly including:
a sensor for sensing hydrogen concentration in one of anode exhaust leaving said anode side of said fuel cell and a gas derived from said anode exhaust,
a fuel flow control assembly for controlling flow of said fuel to said anode side of said fuel cell system based on said hydrogen concentration sensed by said sensor; and
a cooling assembly adapted to receive a predetermined portion of said anode exhaust from said anode side and to transfer water in said predetermined portion of said anode exhaust to output separated water and separated anode exhaust,
wherein said sensor senses hydrogen concentration in said gas derived from said anode exhaust, said gas derived from said anode exhaust comprising said separated anode exhaust.

2. A fuel cell system in accordance with claim 1, wherein said cooling assembly includes:
a cooling connecting line for passing said predetermined portion of said anode exhaust therethrough at a predetermined flow rate to condense said water in said anode exhaust and to output said separated anode exhaust and said separated water;
a gas loop connecting line adapted to receive said separated anode exhaust from said cooling connecting line and to output said separated anode exhaust to said sensor; and
a water loop connecting line adapted to receive said separated water from said cooling connecting line.

3. A fuel cell system in accordance with claim 2, wherein said cooling connecting line comprises stainless steel tubing having an outside diameter of about ¼ to ¼ inches and a length of at least 3 inches.

4. A fuel cell system in accordance with claim 3, wherein said cooling connecting line includes heat trace covering comprising 50% or less of said cooling connecting line surface area.

5. A fuel cell system in accordance with claim 2, wherein said cooling connecting line and said gas loop connecting line are provided at a higher elevation than said water loop connecting line and wherein said separated water is provided to said water loop connecting line by gravitational force.

6. A fuel cell system in accordance with claim 2, wherein said cooling assembly further comprises following said cooling connecting line one of a knock out pot, a heat exchanger, a partial-pressure swing water transfer device, an enthalpy wheel humidifier, a cooling radiator, a membrane, a packed column and an absorber/stripper system for aiding said cooling connecting line in condensing said water in said anode exhaust and in outputting said separated anode exhaust and said separated water.

7. A fuel cell system in accordance with claim 1, wherein said sensor comprises an analyzer that determines the hydrogen concentration in the gas by means of measuring the thermal conductivity of the gas.

8. A fuel cell system in accordance with claim 1, wherein said fuel flow control assembly determines a fuel flow set point based on a hydrogen equivalents value determined using said hydrogen concentration sensed by said sensor and controls said flow of fuel to said anode side based on said fuel flow set point so as to maintain fuel utilization in said fuel cell system within a predetermined range.

9. A fuel cell system in accordance with claim 8, wherein said predetermined range is within 1% of a desired fuel utilization.

10. A fuel cell system in accordance with claim 8, wherein said fuel flow control assembly includes a fuel trim controller for determining said hydrogen equivalents value based on said hydrogen concentration in said anode exhaust sensed by said sensor and for determining said fuel flow set point based on said hydrogen equivalents value, and a fuel flow controller for controlling said fuel flow to said anode side based on said fuel flow set point determined by said fuel trim controller.

11. A fuel cell system in accordance with claim 10, wherein said fuel trim controller determines said hydrogen equivalents value in accordance with the following equation:

$$MH_2 = \frac{Amps * Ncells * 0.0002603}{Flow\ rate * Uf}$$

wherein $MH_2$ is the hydrogen equivalents value, Amps is the amount of current produced in said fuel cell system in amperes, Ncells is the number of fuel cells in said fuel cell system, Flow rate is a measured fuel flow rate in scfm to said anode side and Uf is fuel utilization in said fuel cell determined by said fuel trim controller based on said hydrogen concentration sensed by said sensor.

12. A fuel cell system in accordance with claim 11, wherein:
said fuel trim controller determines whether said hydrogen equivalents value determined by said fuel trim controller is equal to or greater than a predetermined maximum equivalents value and whether said hydrogen equivalents value is equal to or smaller than a predetermined minimum equivalents value; and
if said hydrogen equivalents value is equal to or greater than said predetermined maximum equivalents value, said fuel trim controller determines said fuel flow set point based on said predetermined maximum equivalents value; and
if said hydrogen equivalents value is equal to or smaller than said predetermined minimum equivalents value, said fuel trim controller determines said fuel flow set point based on said predetermined minimum equivalents value.

13. A fuel cell system in accordance with claim 12, wherein said fuel trim controller further determines whether the current produced by said fuel cell system is greater than a predetermined value, and wherein if it is determined that the current produced by said fuel cell is not greater than said predetermined current, said fuel trim controller sets said hydrogen equivalents value to be equal to a predetermined nominal hydrogen equivalents value and said fuel flow controller controls said flow of fuel to said anode side based on said predetermined nominal hydrogen equivalents value.

14. A fuel cell system in accordance with claim 8, further comprising a temperature sensor for sensing temperature of said predetermined portion of said anode exhaust in said cooling assembly, wherein said fuel trim controller adjusts said hydrogen equivalents value to compensate for humidity based on said temperature sensed by said temperature sensor.

15. A fuel cell system in accordance with claim 14, wherein said temperature sensor comprises a thermocouple and wherein said thermocouple is provided in said cooling assembly so as to sense the lowest temperature to which said predetermined portion of said anode exhaust is cooled.

16. A fuel cell system in accordance with claim 1, said system being further adapted to receive water from a water supply for humidifying said fuel before providing said fuel to said anode side, and wherein said flow control assembly further comprises a water flow control assembly for controlling the flow of said water to said fuel cell system based on controlling of said fuel flow to said anode side by said fuel flow control assembly.

17. A fuel cell system in accordance with claim 16, wherein said fuel flow control assembly determines a fuel flow set point based on said hydrogen concentration sensed by said sensor and controls said flow of fuel to said anode based on said fuel flow set point, and wherein said water flow control assembly controls the flow of water to said system based on said fuel flow set point so as to maintain a predetermined carbon to steam ratio in said humidified fuel.

* * * * *